(12) United States Patent
Brown et al.

(10) Patent No.: US 8,100,606 B2
(45) Date of Patent: Jan. 24, 2012

(54) STABILIZING OF SUBMARINE ELONGATE STRUCTURES

(75) Inventors: Philip Gwyn Brown, Perth (AU);
Gordon Charles Cowper, Perth (AU)

(73) Assignee: JP Kenny Pty Ltd, Perth, Western Australia (AU)

( * ) Notice: Subject to any disclaimer, the term of this patent is extended or adjusted under 35 U.S.C. 154(b) by 526 days.

(21) Appl. No.: 12/090,941

(22) PCT Filed: Oct. 20, 2006

(86) PCT No.: PCT/AU2006/001567
§ 371 (c)(1),
(2), (4) Date: Jan. 7, 2009

(87) PCT Pub. No.: WO2007/045047
PCT Pub. Date: Apr. 26, 2007

(65) Prior Publication Data
US 2009/0214298 A1    Aug. 27, 2009

(30) Foreign Application Priority Data

Oct. 20, 2005  (AU) ................................ 2005905798

(51) Int. Cl.
*F16L 1/12* (2006.01)
(52) U.S. Cl. ........................................ 405/171; 405/172
(58) Field of Classification Search ................. 405/158, 405/168.1, 171, 172
See application file for complete search history.

(56) References Cited

U.S. PATENT DOCUMENTS

| 4,704,049 A | 11/1987 | Vilain |
| 6,030,145 A * | 2/2000 | Stewart et al. ................. 405/172 |
| 6,682,266 B2 * | 1/2004 | Karal et al. ................. 405/223.1 |
| 7,246,971 B1 * | 7/2007 | Ellis et al. ................... 405/168.1 |
| 7,600,569 B2 * | 10/2009 | Routeau et al. ............... 166/344 |
| 2005/0180820 A1 | 8/2005 | Zandwijk |
| 2006/0067792 A1 * | 3/2006 | Joshi et al. .................... 405/171 |

FOREIGN PATENT DOCUMENTS

| FR | 2 569 744 | 3/1986 |
| GB | 2 404 428 | 2/2005 |
| WO | WO 01/01028 A2 | 1/2001 |
| WO | WO 01/04454 | 1/2001 |
| WO | WO 01/40695 | 7/2001 |

* cited by examiner

*Primary Examiner* — Tara Mayo-Pinnock
(74) *Attorney, Agent, or Firm* — Merchant & Gould P.C.

(57) ABSTRACT

A stabilization system for stabilizing a submarine pipeline supported on a seabed below water level. The seabed is inclined in that it incorporates a sloping section extending between an upper section and a lower section. The stabilization system includes an upper anchoring mechanism for anchoring the pipeline to the upper seabed section adjacent the top end of the sloping section and the other being a lower anchoring mechanism for anchoring the pipeline to the lower seabed section adjacent the bottom end of the sloping seabed section. A buoyancy mechanism is provided along the extent of the pipeline section between the two anchoring mechanisms. The buoyancy provided by the buoyancy mechanism maintains the pipe section above and out of contact with the sloping seabed section.

27 Claims, 4 Drawing Sheets

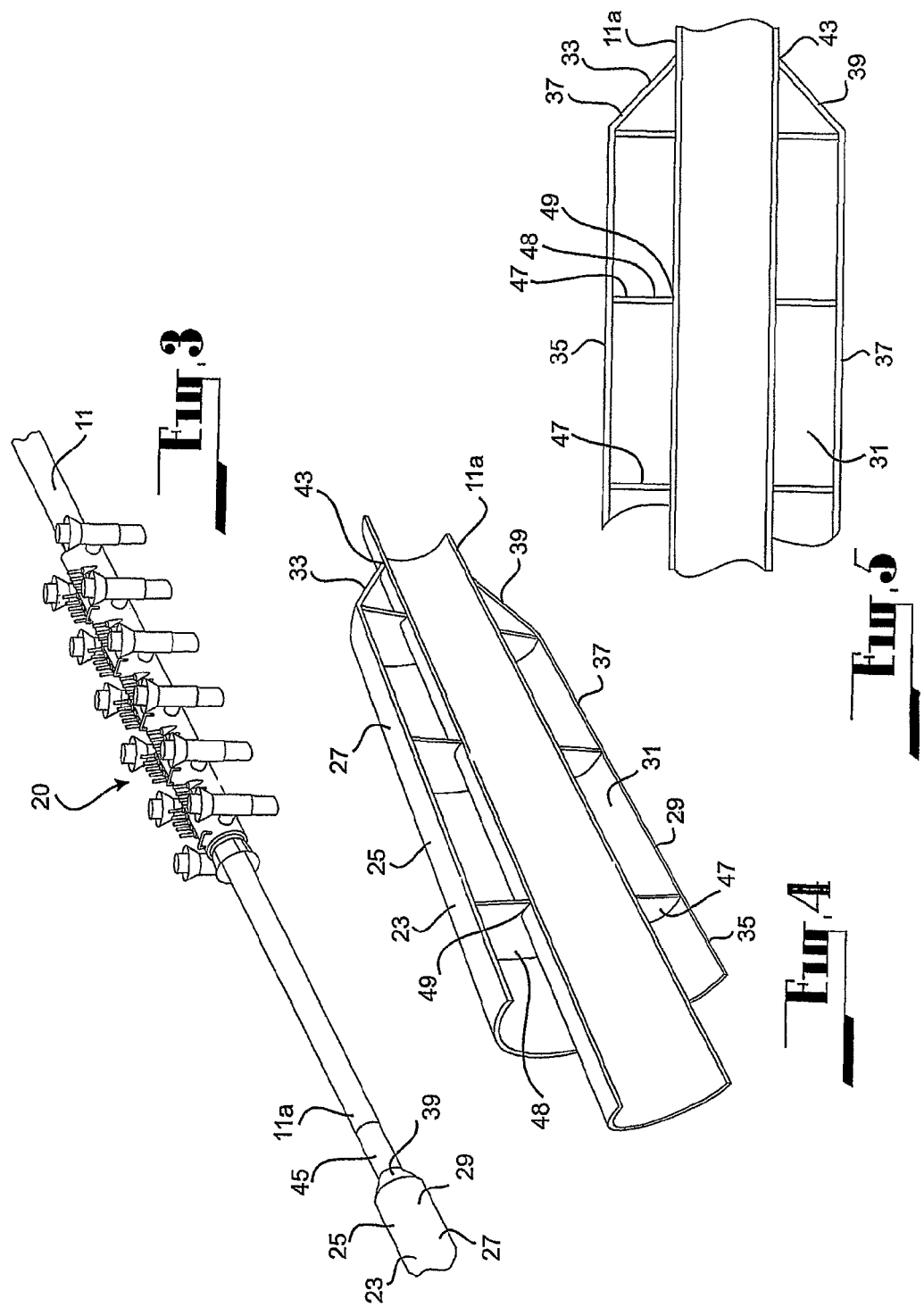

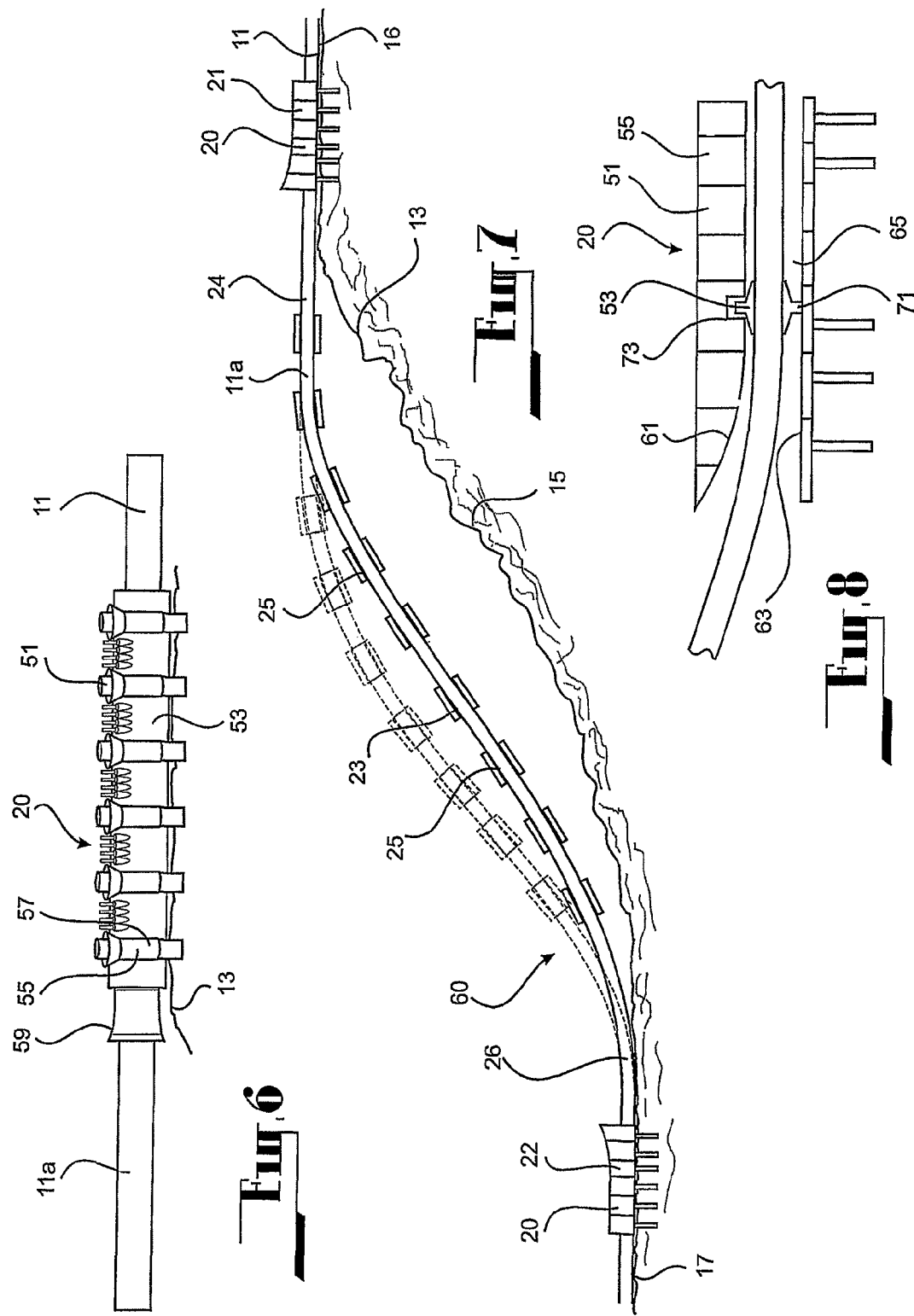

STABILIZING OF SUBMARINE ELONGATE STRUCTURES

FIELD OF THE INVENTION

This invention relates to stabilisation of submarine elongate structures, such as pipelines including single and multiple pipelines (bundled and unbundled), as well as umbilicals, cables, and other service conduits.

BACKGROUND ART

Submarine elongate structures, and in particular submarine pipelines, can become unstable through exposure to environmental influences, particularly hydrodynamic loads arising from underwater currents and wave action. These hydrodynamic loads typically increase in regions of shallow water. The combination of extreme environmental loads and shallow water are present in Australian waters, typically on the North West Shelf off the West Australian coast.

Various systems are currently utilised for submarine pipeline stabilisation, including weight coatings on pipelines, coverings on pipelines, installation of pipelines in trenches in the seabed, and securing pipelines to the seabed by way of mechanical anchors. Various deficiencies and problems can be associated with each of these stabilisation systems. For example, weight coating requirements for pipelines can be very high or impracticable. Trenching of pipelines is required to be deep in the seabed. Coverings over the pipeline need to be thick and of adequate weight, and in some cases the covering material may itself be unstable. Mechanical anchors of high capacity are required at close intervals to secure the pipelines to the seabed.

While the abovementioned systems can be utilised in many situations, there are locations where the cost involved can be very high or indeed prohibitive, and the installation procedure can be time-consuming.

A stabilisation system which seeks to address the deficiencies outlined above is disclosed in the applicant's international application WO 01/01028. While this stabilisation system has proved to be particularly effective, difficulties can be encountered in stabilising a section of a pipeline extending over certain seabed formations, particularly an area of a seabed which is sloping and also irregular. The irregularity may consist of roughness arising through, for example, the presence of rocky outcrops on the seabed.

It against this background, that the present invention has been developed.

The preceding discussion to the invention is intended only to facilitate an understanding of the present invention. It should be appreciated that the discussion is not an acknowledgement or an admission that any of the material referred to was or is part of the common general knowledge in Australia as at the priority date of the application.

DISCLOSURE OF THE INVENTION

According to a first aspect of the invention there is provided a stabilisation system for stabilising a section of a submarine elongate structure, the stabilisation system comprising an end anchoring means at each end of said section for anchoring the end to the seabed, and buoyancy means for providing buoyancy to an extent of said section between the two anchoring means.

Preferably, the buoyancy means provides buoyancy to the full extent of said section between the two anchoring means.

Preferably, the buoyancy is sufficient to maintain the full extent of said section above the seabed.

In one arrangement, the buoyancy means may comprise a buoyant structure attached to said section of the submarine elongate structure to extend along at least a substantial part of the extent thereof. The buoyant structure may comprise a buoyancy collar. The buoyancy collar may comprise a shell defining a buoyancy space about said section of the submarine elongate structure.

The shell may sealingly engage said section of the submarine elongate. The shell may, for example, have opposed ends adapted to sealingly engage said section of the submarine elongate structure.

The shell may be supported on said section of the submarine elongate structure at intervals along the extent thereof.

In another arrangement, the buoyancy means may comprise a plurality of floats attached to said section of the submarine elongate structure at intervals along the extent thereof.

Preferably, each anchoring means is adapted to be secured to the elongate structure to transfer axial tension generated by lateral movement of the elongate structure to the seabed.

Preferably, each anchoring means comprises a restraint structure for controlling curvature of the elongate structure at the anchoring means.

The restraint structure may comprises a pair restraint faces spaced apart to define a gap along which the elongate structure can extend, the restraint faces being configured such that the gap therebetween is of varying width for controlling curvature of the elongate structure during lateral movement thereof.

The elongate structure may be attached to each restraint structure by way of an anchoring collar fitted onto the elongate structure and in engagement with the restraint structure.

With this arrangement, said section of the elongate structure between the two end anchoring means assumes a profile which is typically curved and somewhat sinusoidal. Any additional lateral movement of the elongate structure (in either vertical or horizontal directions) induces tension in the elongate structure which is transmitted to the anchoring means.

The invention is particularly suitable for stabilising a section of a submarine elongate structure extending along a rough and sloping seabed, with one anchoring means being located on the seabed adjacent the upper end of the sloping seabed section and the other anchoring means being located on the seabed adjacent the lower end of the sloping seabed section.

According to a second aspect of the invention there is provided a submarine elongate structure extending across a seabed having a section thereof sloping, elongate structure being anchored to the seabed adjacent the upper end of the sloping seabed section and also anchored to the seabed adjacent the lower end of the sloping seabed section, the section of the elongate structure between the two anchoring locations being buoyant to maintain the said section above the sloping seabed section.

According to a third aspect of the invention there is provided a buoyancy structure for providing buoyancy to a section of a submarine elongate structure, the buoyancy structure comprising a shell adapted to be installed on said section of the submarine elongate structure to define a buoyancy space about said section of the submarine elongate structure. The shell may sealingly engage said section of the submarine elongate. The shell may, for example, have opposed ends adapted to sealingly engage said section of the submarine elongate structure. The shell may be supported on said section of the submarine elongate structure at intervals along the extent thereof. Such support may be provided by support elements such as ribs adapted for engagement with said section of the submarine elongate structure.

According to a fourth aspect of the invention there is provided a method of stabilising a section of a submarine elongate structure, the method comprising anchoring the ends of said section to the seabed, and providing buoyancy to an extent of said section between the two ends of said section.

The method may comprise attaching a buoyancy means to said section of the submarine elongate structure to provide the buoyancy thereto.

The buoyancy means may be attached to said section of the submarine elongate structure prior to anchoring thereof to the seabed.

Further, the buoyancy means may be attached to said section of the submarine elongate structure prior to full immersion of said section into the water.

According to a fifth aspect of the invention therein is provided a submarine elongate structure stabilised by a stabilisation system according to the first aspect of the invention.

According to a sixth aspect of the invention therein is provided a submarine elongate structure stabilised by method according to a fourth aspect of the invention.

BRIEF DESCRIPTION OF THE DRAWINGS

The invention will be better understood by reference to the following description of several specific embodiments thereof as shown in the accompanying drawings in which:

FIG. 3 is a fragmentary view of the pipeline showing an anchoring means and a portion of a buoyancy collar attached to a section of the pipeline adjacent the anchoring means;

FIG. 4 is a fragmentary perspective view in section of the buoyancy collar on the pipeline section;

FIG. 5 is a side view of the arrangement shown in FIG. 4;

FIG. 6 is a fragmentary side view of the pipeline showing one anchoring means;

FIG. 7 is a schematic side view of a stabilisation system according to a second embodiment anchoring a submarine pipeline with respect to a sloping section of seabed below the pipeline; and FIG. 8 is a schematic side elevational view of anchoring means forming part of the stabilisation system of FIG. 7.

BEST MODE(S) FOR CARRYING OUT THE INVENTION

Figure 1:
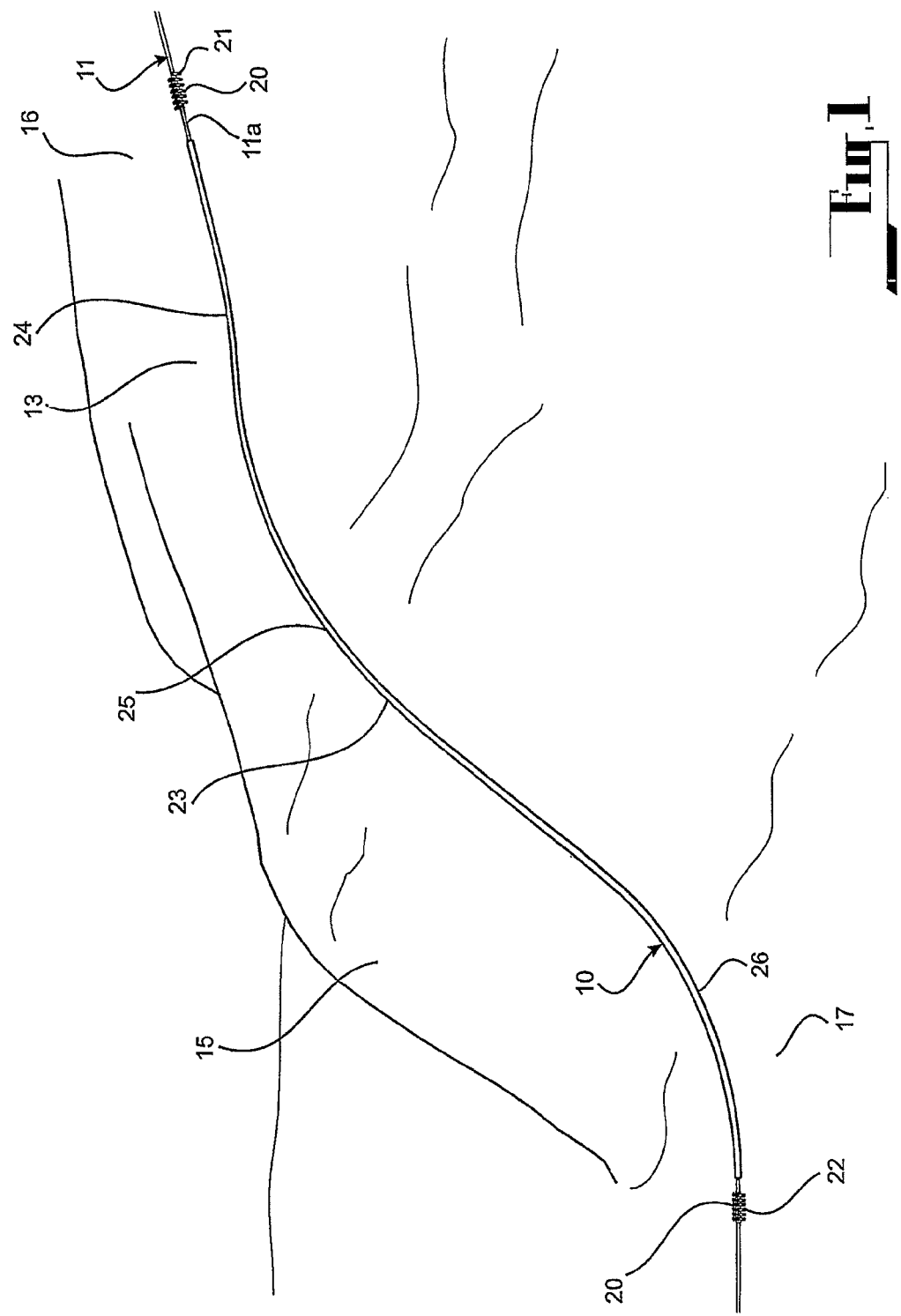
FIG. 1 is a schematic perspective view of a stabilisation system according to a first embodiment anchoring a submarine pipeline with respect to a sloping section of seabed below the pipeline.

The embodiment shown in the drawings is directed to a stabilisation system 10 for stabilising a submarine pipeline 11 supported on a seabed 13 below water level. The seabed 13 is inclined in that it incorporates a sloping section 15 extending between an upper section 16 and a lower section 17. In this embodiment, the sloping seabed section 15 presents a rough formation which typically may arise due to the presence of rock outcrops.

The roughness of the sloping seabed section 15 can impede lateral movement of the pipeline 11 as well as damage the pipeline, and so the stabilisation system 10 according to the embodiment seeks to support the pipeline 11 above the sloping seabed section 15. In this way, the pipeline 11 can deflect within allowable limits without contacting the sloping seabed section 15.

Referring now to FIGS. 1 to 6, the stabilisation system 10 according to a first embodiment comprises two anchoring means 20, one being an upper anchoring means 21 for anchoring the pipeline 11 to the upper seabed section 16 adjacent the top end of the sloping section 15 and the other being a lower anchoring means 22 for anchoring the pipeline 11 to the lower seabed section 17 adjacent the bottom end of the sloping seabed section 15. The section of the pipeline 11 extending between the two anchoring means 21, 22 is identified by reference numeral 11a.

Figure 2:
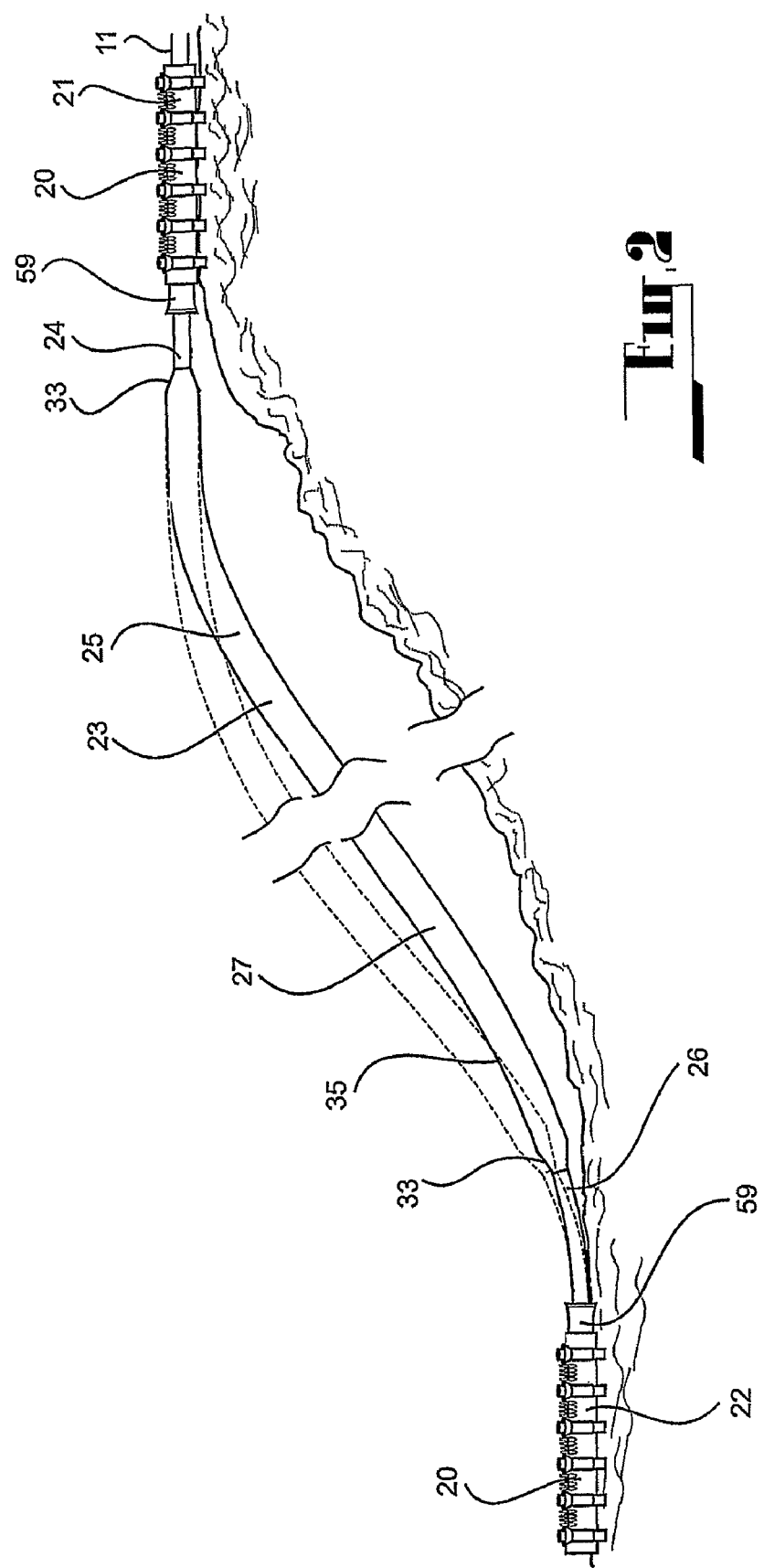
FIG. 2 is a fragmentary schematic side elevational view of the arrangement shown in FIG. 1.

The anchoring means 20 are each configured to accommodate a curved profile in that part of the pipeline 11 extending across the sloping seabed section 15, as shown in FIGS. 1 and 2. The curved profile is somewhat sinusoidal, involving curvature at location 24 adjacent the upper anchoring means 21 extending away from the seabed and also curvature at location 26 adjacent the lower anchoring means 22 also extending away from the seabed.

Buoyancy means 23 are provided along the extent of the pipeline section 11a between the two anchoring means 21, 22.

In this embodiment, the buoyancy means 23 comprises a buoyant structure 25 attached to said section 11a of the submarine pipeline 11 to extend along at least a substantial part of the extent thereof. In the arrangement shown, the buoyancy structure 25 terminates at locations in close proximity to the anchoring means 20, as best seen in FIGS. 1 and 2.

The buoyant structure 25 comprises a buoyancy collar 27 adapted to be fitted onto said section 11a of the submarine pipeline 11. The buoyancy collar 27 is fitted onto said section 11a of the submarine pipeline 11 above water prior to laying of said section on the seabed 13.

The buoyancy collar 27 comprise a shell 29 defining a buoyancy space 31 containing air about said section 11a of the submarine pipeline 11. The shell has two end sections 33 and an intermediated section 35. The intermediate section 35 comprises a cylindrical side wall portion 37 and each end section 33 comprises a tapering wall portion 39 which converges to an opening 43 through which said section 11a of the submarine pipeline 11 extends. A seal 45 is applied around each opening 43 between the respective end section 33 and the adjacent potion of the pipeline 11 to prevent ingress of water into the buoyancy space 31. The seal 45 is not shown in FIGS. 4 and 5.

The shell 29 is supported on said section 11a of the submarine pipeline 11 is supported on said section 11a of the submarine pipeline 11 at intervals along the extent thereof. The support is provided by engagement of the end sections 33 on said section 11a of the submarine pipeline 11. Additionally, the support is provided by support elements 47 spaced along the shell 29. Each support element 47 is configured as a rib 48 having a central hole 49 therein through which said section 11a of the submarine pipeline 11 is received to be engaged by the rib.

The buoyancy provided by the buoyancy means 23 is sufficient to maintain the pipe section 11a above and out of contact with the sloping seabed section 15, as seen in FIGS. 1 and 2.

Each anchoring means 20 comprises a restraint structure 51 installed on the seabed 13 and an anchoring collar 53 secured to the pipeline 11 and in engagement with the restraint structure 53. With this arrangement, tension induced in the pipeline 11 through lateral movement (in the vertical or horizontal directions) is transmitted to the seabed 13 through the anchoring collar 53 and the restraint structure 51.

The restraint structure 51 comprises a restraint frame 55 having piles 57 embedded in the seabed 13.

The restraint collar 53 has an end portion 59 at each end thereof configured as a bell mouth functioning as a bend restrictor for limiting the extent to which that section of the pipeline can deflect laterally.

Referring now to FIGS. 7 and 8, the stabilisation system 60 according to the second embodiment is similar in some resects to the first embodiment and like reference numerals are used to identify corresponding parts. In this second embodiment, the buoyancy means 23 comprises a plurality of buoyancy units 25 such as floats positioned at spaced intervals along the extent (length) of the pipeline section 11*a*. The buoyancy provided by the buoyancy means 23 is sufficient to maintain the pipe section 11*a* above and out of contact with the sloping seabed section 15.

Further, in this second embodiment, the restraint frame 55 presents an upper restraint surface 61 and a lower restrain surface 63, with the two restraint surfaces being in spaced apart relationship to define a gap 65 therebetween through which the pipeline extends, as best seen in FIG. 8.

The upper and lower restraint faces 61, 63 may each be continuous, or may simply be defined by frame elements within the restraint frame 55 positioned in spaced apart relationship.

The upper restraint surface 61 is curved, as best seen in FIG. 8, with the curvature being away from the seabed in the direction approaching the sloping seabed section 15. In this way, the pipeline 11 can assume the profile referred to earlier, involving a somewhat sinusoidal curvature extending away from the seabed 13 at locations 24, 26. The upper restraint face 61 controls the radius of curvature of the pipeline 11 within the restraint structure 51.

The anchoring collar 53, which is secured to the pipeline 11, incorporates a peripheral flange 71 which locates in a matching recess 73 within the restraint structure 51. This provides restraint against axial movement of the pipeline 11 within the restraint structure 51 and so transmits tension induced in the pipeline 11 through any additional lateral movement of the pipeline to the restraint frame 55 which in turn transmits the resultant forces to the seabed 13.

FIG. 7 also illustrates in phantom outline a vertically deflected condition of the pipeline section 11*a*, with the ends thereof being restrained by the restraint structures 51 to control the curvature thereof.

From the foregoing, it is evident that the present embodiments each provides a simple yet highly effective vertical strategic anchoring system for anchoring a pipeline with respect to a seabed incorporating a sloping section over which the pipeline extends.

It should be appreciated that the scope of the invention is not limited to the scope of the embodiments described.

Modifications and improvements can be made without departing from the scope of the invention.

Throughout the specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A stabilization system for stabilizing a section of a submarine elongate structure, the stabilization system comprising end anchoring means at each end of said section for anchoring the end to the seabed, and buoyancy means for providing buoyancy to an extent of said section between the two anchoring means, the buoyancy means comprising a buoyant structure attached to said section of the submarine elongate structure to extend along at least a substantial part of the extent thereof, the buoyant structure comprising a buoyancy collar comprising a shell defining a buoyancy space about said section of the submarine elongate structure, the shell having two end sections and an intermediate section, the intermediate section comprising a cylindrical side wall portion and each end section comprising a tapering wall portion converging to an opening through which said section of the submarine elongate structure extends, each end anchoring means comprising a restraint structure adapted to be installed on the seabed and an anchoring collar adapted to be secured on the submarine elongate structure at said end for engagement with the restraint structure for restraining the respective end against movement in the longitudinal direction of the elongate structure.

2. A stabilization system according to claim 1 wherein the buoyancy means provides buoyancy to the full extent of said section between the two anchoring means.

3. A stabilization system according to claim 1 wherein the buoyancy is sufficient to maintain the full extent of said section above the seabed.

4. A stabilization system according to claim 1 wherein the shell sealingly engages said section of the submarine structure.

5. A stabilization system according to claim 4 wherein the shell has opposed ends adapted for sealing engagement with said section of the submarine elongate structure.

6. A stabilization system according to claim 4 wherein the shell is supported on said section of the submarine elongate structure at intervals along the extent thereof.

7. A stabilization system according to claim 6, further comprising support elements spaced along the shell.

8. A stabilization system according to claim 7 wherein each support element comprises a rib having a central hole therein through which said section of the submarine elongate structure is received to be engaged by the rib.

9. A stabilization system according to claim 1 wherein a seal is applied around each opening between the respective end section and the adjacent portion of the submarine elongate structure to prevent ingress of water into the buoyancy space.

10. A stabilization system according to claim 1 wherein the buoyancy means comprises a plurality of floats attached to said section of the submarine elongate structure at intervals along the extent thereof.

11. A stabilization system according to claim 1 wherein each anchoring means is adapted to be secured to the elongate structure to transfer axial tension generated by lateral movement of the elongate structure to the seabed.

12. A stabilization system according to claim 1 wherein each restraint structure is adapted to control curvature of the elongate structure at the anchoring means.

13. A stabilization system according to claim 12 wherein the restraint structure comprises a pair of restraint faces spaced apart to define a gap along which the elongate structure can extend, the restraint faces being configured such that the gap therebetween is of varying width for controlling curvature of the elongate structure during lateral movement thereof.

14. A stabilization system according to claim 12 wherein the elongate structure is attached to each restraint structure by an anchoring collar fitted onto the elongate structure and in engagement with the restraint structure.

15. A submarine elongate structure stabilized by a stabilization system according to claim 1.

16. A submarine elongate structure extending across a seabed having a section thereof sloping, the elongate structure being anchored against axial movement with respect to the seabed adjacent the upper end of the sloping seabed section by first anchoring means and also anchored against axial movement with respect to the seabed adjacent the lower end of the sloping seabed section by second anchoring means, the section of the elongate structure extending between the first anchoring means and the second anchoring means being buoyant to maintain the section above the sloping seabed section, said section being buoyed by a buoyant structure attached to said section of the submarine elongate structure to extend along at least a substantial part of an extent of said section between the first anchoring means and the second anchoring means, the buoyant structure comprising a buoyancy collar comprising a shell defining a buoyancy space about said section of the submarine elongate structure, the shell having two end sections and an intermediate section, the intermediate section comprising a cylindrical side wall portion and each end section comprising a tapering wall portion converging to an opening through which said section of the submarine elongate structure extends, each anchoring means comprising a restraint structure adapted to be installed on the seabed and an anchoring collar adapted to be secured on the submarine elongate structure for engagement with the restraint structure for restraining the elongate structure against said axial movement.

17. A stabilization system for stabilizing a section of a submarine elongate structure, the stabilization system comprising end anchoring means at each end of said section for anchoring the respective end to the seabed, buoyancy means for providing buoyancy to an extent of said section between the two anchoring means, each end anchoring means comprising a restraint structure for controlling curvature of the elongate structure at the anchoring means, wherein the restraint structure comprises a pair of restraint faces spaced apart to define a gap along which the elongate structure can extend, the restraint faces being configured such that the gap therebetween is of varying width for controlling curvature of the elongate structure during lateral movement thereof.

18. A stabilization system according to claim 17 wherein the elongate structure is attached to each restraint structure by way of an anchoring collar fitted onto the elongate structure and in engagement with the restraint structure.

19. A submarine elongate structure stabilized by a stabilization system according to claim 17.

20. A buoyancy structure for providing buoyancy to a section of a submarine elongate structure, the buoyancy structure comprising a shell adapted to be installed on said section of the submarine elongate structure to define a buoyancy space about said section of the submarine elongate structure, the shell having opposed ends adapted for sealing engagement with said section of the submarine elongate structure, the shell being supported on said section of the submarine elongate structure at intervals along the extent thereof, and the shell having two end sections and an intermediated section, the intermediate section comprising a cylindrical side wall portion and each end section comprising a tapering wall portion converging to an opening through which said section of the submarine elongate structure extends.

21. A buoyancy structure according to claim 20 wherein a seal is applied around each opening between the respective end section and the adjacent portion of the pipeline to prevent ingress of water into the buoyancy space.

22. A buoyancy structure according to claim 20, further comprising support elements spaced along the shell.

23. A buoyancy structure according to claim 22 wherein each support element comprises a rib having a central hole therein through which said section of the submarine pipeline is received to be engaged by the rib.

24. A method of stabilizing a section of a submarine elongate structure, the method comprising installing a restraint structure on the seabed adjacent each end of said section of submarine elongate structure, securing an anchoring collar on the submarine elongate structure at each end of said section thereof, establishing engagement between the restraint structure and the anchoring collar for restraining the respective end of said section against movement in the longitudinal direction of the elongate structure, and providing buoyancy to an extent of said section between the two ends of said section, wherein buoyancy means are attached to said section of the submarine elongate structure to provide the buoyancy thereto, the buoyancy means comprising a buoyant structure attached to said section of the submarine elongate structure to extend along at least a substantial part of the extent thereof, the buoyant structure comprising a buoyancy collar comprising a shell defining a buoyancy space about said section of the submarine elongate structure, the shell having two end sections and an intermediate section, the intermediate section comprising a cylindrical side wall portion and each end section comprising a tapering wall portion converging to an opening through which said section of the submarine elongate structure extends.

25. A method according to claim 24 wherein the buoyancy means are attached to said section of the submarine elongate structure prior to establishing engagement between the restraint structure and the anchoring collar at each end of said section.

26. A method according to claim 24 wherein the buoyancy means are attached to said section of the submarine elongate structure prior to full immersion thereof into the water.

27. A method of stabilizing a section of a submarine elongate structure, the method comprising anchoring the ends of said section to the seabed, providing buoyancy to an extent of said section between the two ends thereof, and controlling curvature of the elongate structure at each end of said section at which the elongate structure is anchored to the seabed, the buoyancy to said section being provided by buoyancy means comprising a buoyant structure attached to said section of the submarine elongate structure to extend along at least a substantial part of the extent thereof, the buoyant structure comprising a buoyancy collar comprising a shell defining a buoyancy space about said section of the submarine elongate structure, the shell having two end sections and an intermediate section, the intermediate section comprising a cylindrical side wall portion and each end section comprising a tapering wall portion converging to an opening through which said section of the submarine elongate structure extends.

* * * * *